(12) United States Patent
Takori et al.

(10) Patent No.: US 11,447,064 B1
(45) Date of Patent: Sep. 20, 2022

(54) VEHICLE BODY SIDE STRUCTURE

(71) Applicant: HONDA MOTOR CO., LTD., Tokyo (JP)

(72) Inventors: Masayoshi Takori, Wako (JP); Naoto Inoue, Tokyo (JP); Go Shimizu, Tokyo (JP); Yuji Tsuchiya, Wako (JP); Ryuya Kawaji, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/675,611

(22) Filed: Feb. 18, 2022

(30) Foreign Application Priority Data

Mar. 2, 2021 (JP) .............................. JP2021-032577

(51) Int. Cl.
| | |
|---|---|
| *B60Q 1/12* | (2006.01) |
| *F21S 41/663* | (2018.01) |
| *B60Q 1/00* | (2006.01) |
| *B60Q 1/32* | (2006.01) |

(52) U.S. Cl.
CPC ........... *B60Q 1/122* (2013.01); *B60Q 1/0023* (2013.01); *B60Q 1/323* (2013.01); *F21S 41/663* (2018.01)

(58) Field of Classification Search
CPC .. B60Q 1/0017–0023; B60Q 1/12–143; B60Q 1/247; B60Q 1/34–425; F21S 41/60–675
See application file for complete search history.

(56) References Cited

U.S. PATENT DOCUMENTS

| | | | | |
|---|---|---|---|---|
| 5,428,512 A | * | 6/1995 | Mouzas | B60Q 1/12 362/802 |
| 6,481,876 B2 | * | 11/2002 | Hayami | B60Q 1/18 362/465 |

FOREIGN PATENT DOCUMENTS

JP       2007-269268 A     10/2007

\* cited by examiner

*Primary Examiner* — Jason M Han
(74) *Attorney, Agent, or Firm* — Rankin, Hill & Clark LLP

(57) ABSTRACT

A vehicle body side structure includes: a cornering light as a light source configured to illuminate an area in a turning direction when a vehicle turns; a light path forming a path, through which light from the cornering light passes toward the area in the turning direction; and a reflector provided in the light path and reflecting at least a part of the light to illuminate an area in the vicinity of a door opening on a lateral side of a vehicle body.

4 Claims, 6 Drawing Sheets

VEHICLE BODY SIDE STRUCTURE

CROSS-REFERENCE TO RELATED APPLICATION

The present application claims the benefit of priority to Japanese Patent Application No. 2021-032577 filed on Mar. 2, 2021, the disclosures of all of which are hereby incorporated by reference in their entireties.

TECHNICAL FIELD

The present disclosure relates to a vehicle body side structure to allow cornering lights of a vehicle to be used as welcome lamps.

BACKGROUND

In recent years, a vehicle is equipped with welcome lamps which illuminate an area to be stepped by a user, to improve convenience and safety. The vehicle includes lighting devices such as headlights, and using the lighting devices as welcome lamps is considered. For example, Japanese Patent Application Publication No. 2007-269268 describes cornering lights to be used as welcome lamps for users in front of the vehicle.

The cornering lights are attached to a front surface or front portions of side surfaces of the vehicle, to partially illuminate areas on both sides of the vehicle. However, the cornering lights are not designed to emit light rearward, to have insufficient illumination coverage as welcome lamps.

The present disclosure is intended to solve the above problem and provides a vehicle body side structure to allow cornering lights of a vehicle to be used as welcome lamps.

SUMMARY

To solve the problem described above, a vehicle body side structure of the present disclosure, with a cornering light configured to illuminate an area in a turning direction when a vehicle turns, includes: the cornering light as a light source; a light path forming a path, through which light from the cornering light passes toward the area in the turning direction; and a reflector provided in the light path and reflecting at least a part of the light to illuminate an area in the vicinity of a door opening on a lateral side of a vehicle body.

According to the present disclosure, the cornering lights of the vehicle are used as welcome lamps to illuminate surroundings of the vehicle, with a simple configuration.

DETAILED DESCRIPTION

Figure 1:
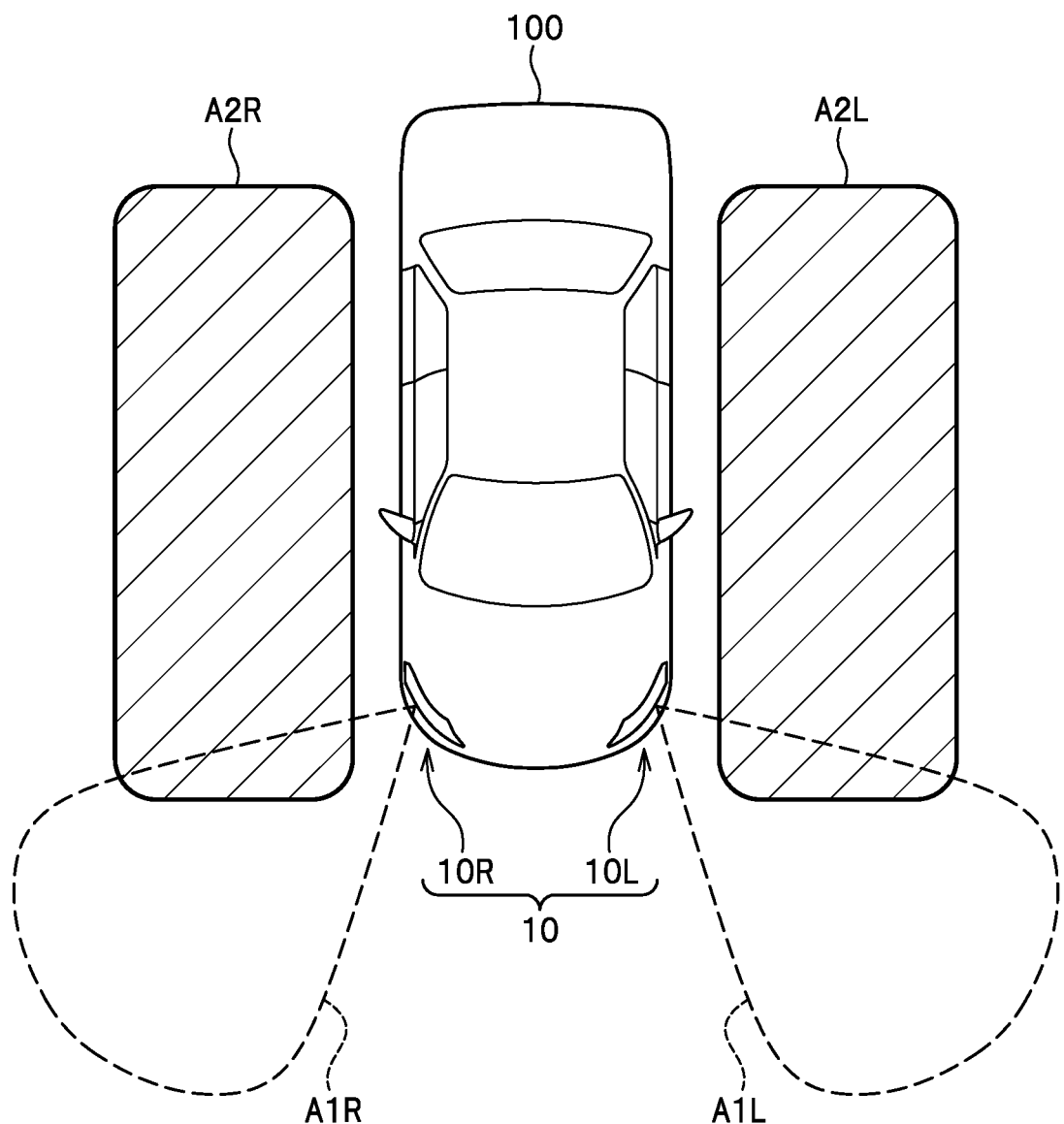
FIG. 1 is a plan view of an example showing areas illuminated by a vehicle body side structure according to an embodiment.

A description is given of an embodiment of the present disclosure with reference to the drawings. As shown in FIG. 1, a vehicle body side structure 10 according to an embodiment of the present disclosure includes vehicle body side structures 10L, 10R, which are symmetrically provided, on both sides at a front of a vehicle 100.

The vehicle body side structure 10 is equipped with cornering lights, each illuminating an area in a turning direction when the vehicle 100 turns. When the vehicle 100 travels and turns right, the vehicle body side structure 10 puts on the right cornering light, and when the vehicle 100 turns left, the vehicle body side structure 10 puts on the left cornering light. As an example, areas A1*l*, A1R on the ground illuminated by the cornering lights when the vehicle 100 turns are shown by dotted lines in FIG. 1.

When the vehicle is not traveling, the vehicle body side structure 10 allows the cornering lights to be used as welcome lamps. As an example, areas A2L, A2R on the ground illuminated by the welcome lamps of the vehicle body side structure 10 are shown by slant lines in FIG. 1. The areas A2L, A2R are, for example, located in the vicinities of door openings on lateral sides of a vehicle body.

Figure 2:
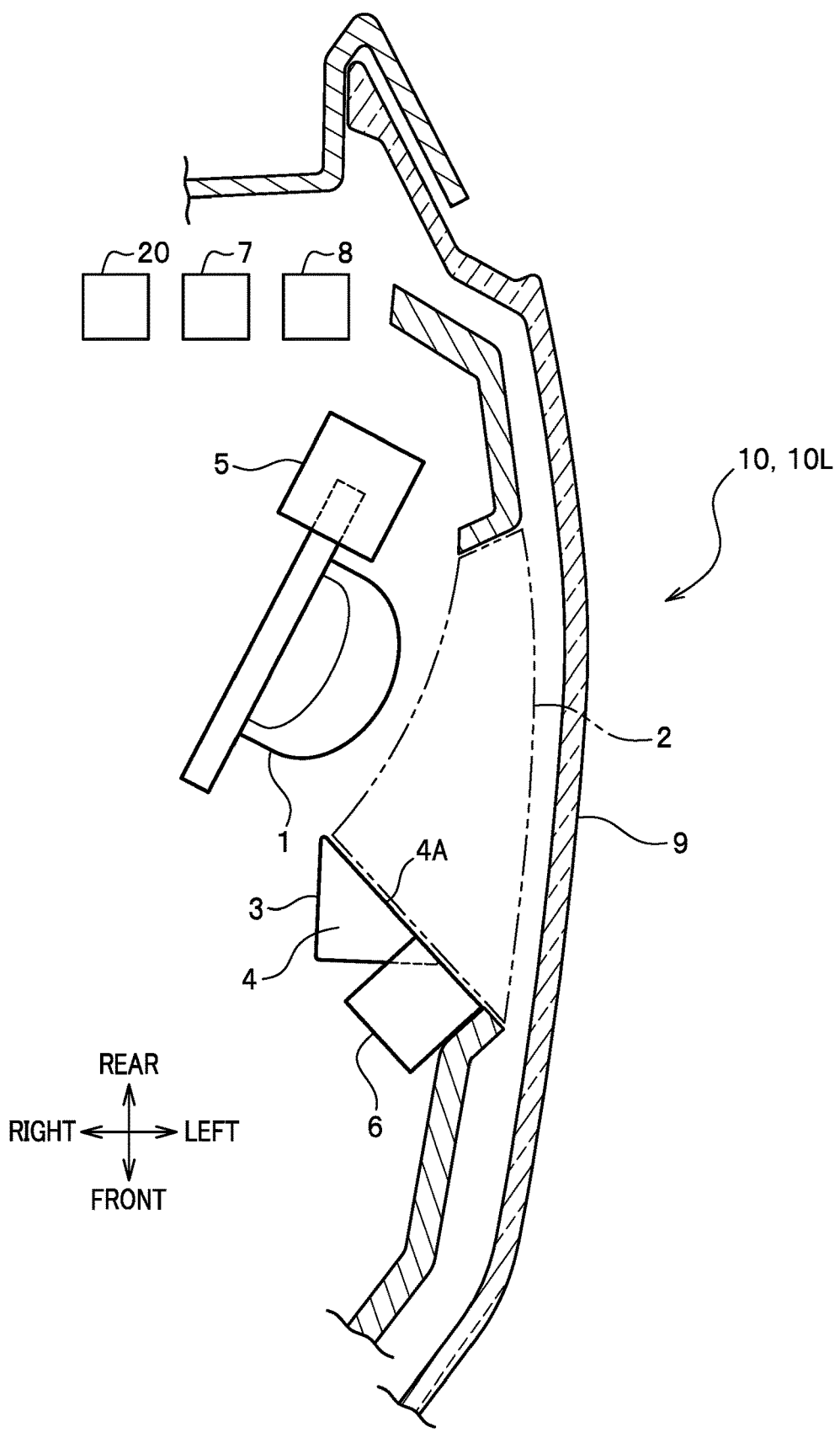
FIG. 2 is schematic cross-sectional view of the vehicle body side structure according to the embodiment when a vehicle is traveling.
Figure 3:
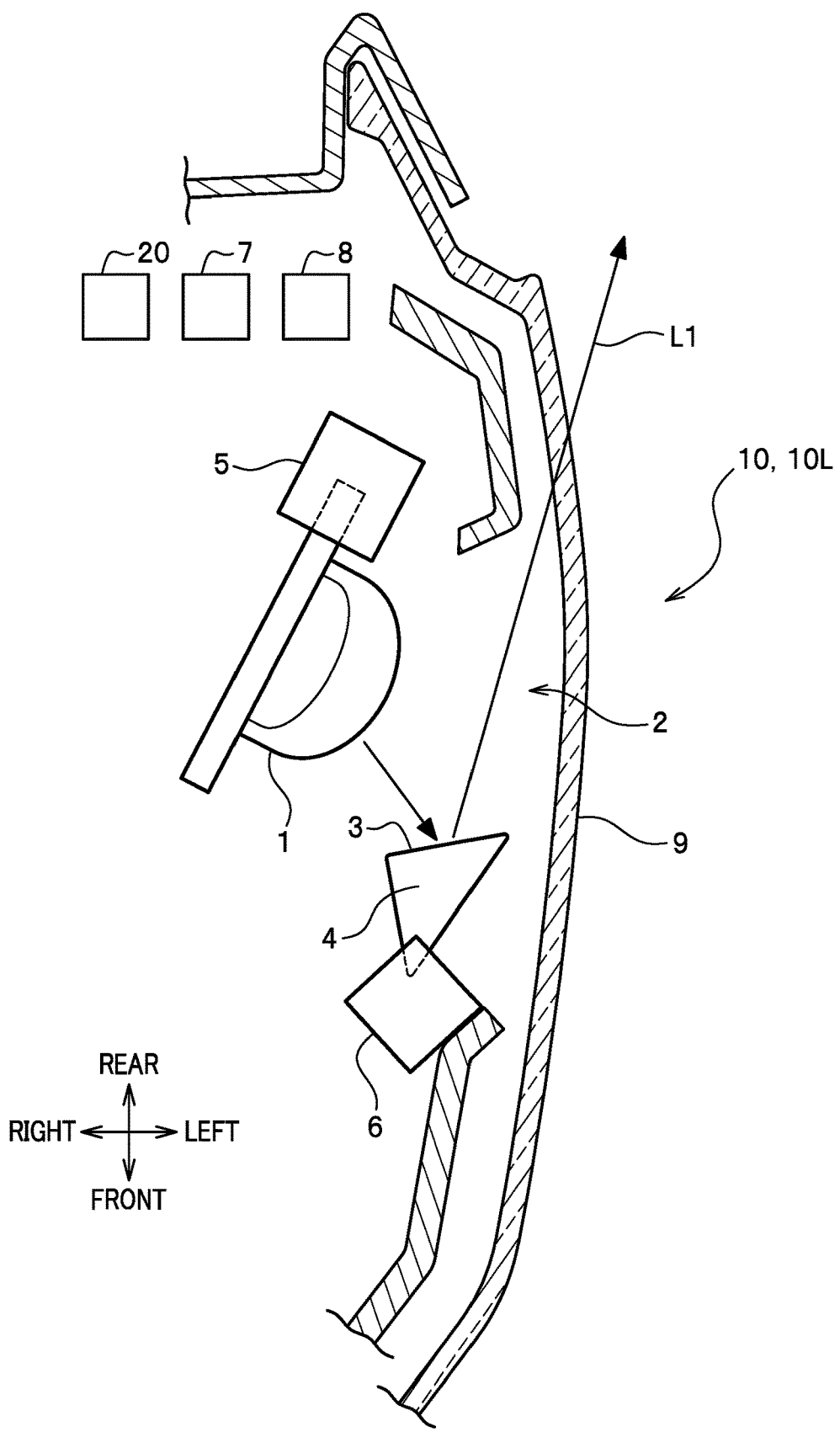
FIG. 3 is a schematic cross-sectional view of the vehicle body side structure according to the embodiment used as a welcome lamp.
Figure 4:
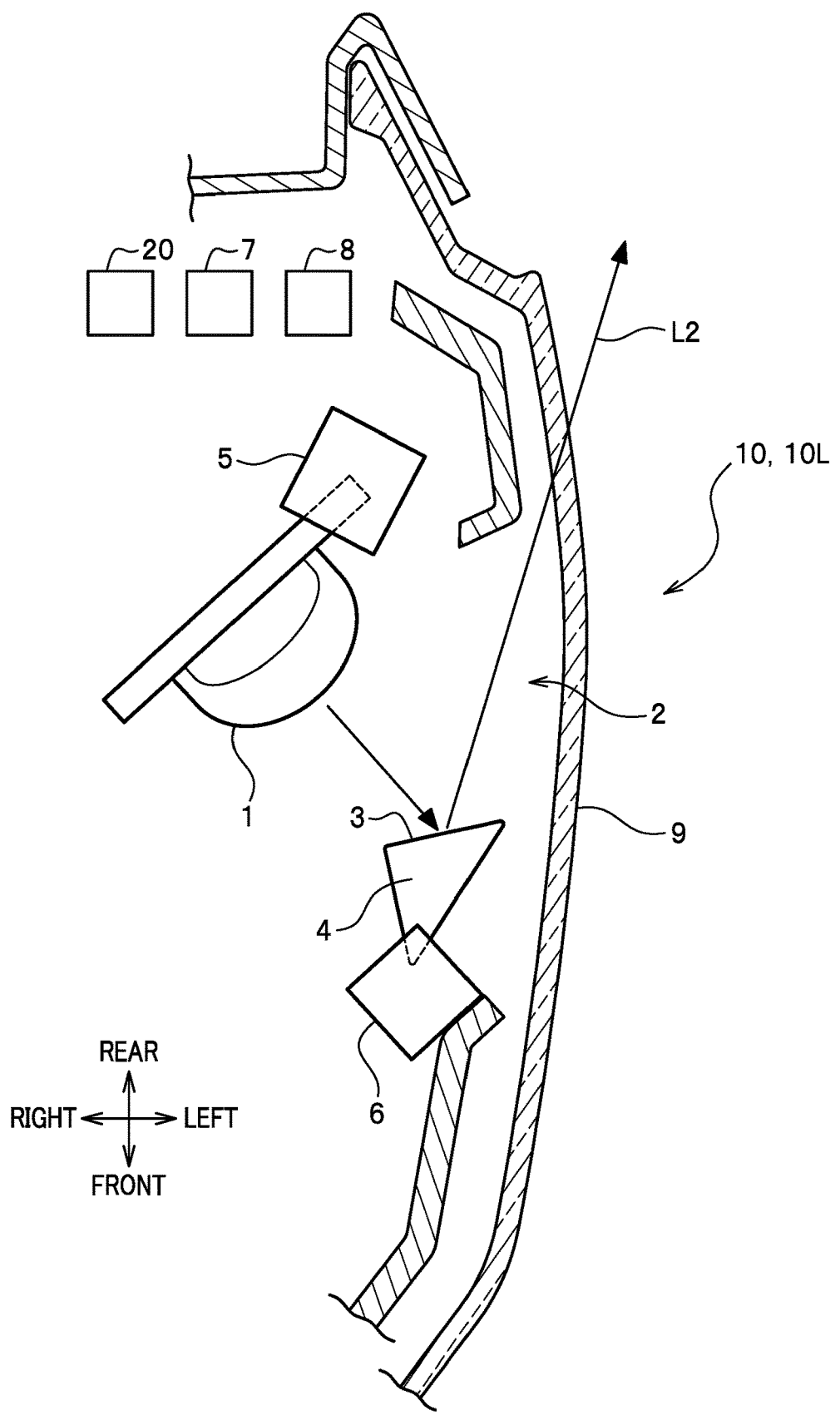
FIG. 4 is a schematic cross-sectional view of the vehicle body side structure according to the embodiment used as a welcome lamp.

The vehicle body side structures 10L, 10R have the same configuration so that the vehicle body side structure 10L on the left side is described below. FIGS. 2 to 4 are each an enlarged schematic horizontal cross-sectional view of the vehicle body side structure 10L. The vehicle body side structure 10L includes a cornering light 1, a light path 2, a reflector 3, a light controller 8, a driver 6, a reflection controller 7, and a user sensor 20.

<Cornering Light>

The cornering light 1 is a member to serve as a light source to illuminate an area in a turning direction when the vehicle 100 turns, and is supported by a support 5. The cornering light 1 includes a light emitting member such as a light emitting diode and a halogen bulb, and the light emitting member is electrically connected to the light controller 8 to be described below.

<Light Path>

The light path 2 is a path through which light from the cornering light 1 passes toward an area in a turning direction when the vehicle 100 turns. The light path 2 is formed of a cylindrical member having a larger diameter toward an outside of the vehicle, for example. As shown in FIG. 1, the light path 2 of the vehicle body side structure 10L is provided to illuminate the area A1*l* ahead of the vehicle 100 on the left, for example.

When laterally viewed, the light path 2 has an oval shape elongated in a front-rear direction, for example. An opening of the light path 2 increases in area toward the lateral outer side of the vehicle 100. A transparent or translucent lens member 9 is provided on an outer side (lateral side) of the light path 2.

<Reflector>

The reflector 3 is a member provided in the light path 2 and reflects at least a part of the light to illuminate an area in the vicinity of the door openings on the lateral side of the vehicle. Note that, as shown in FIG. 1, the areas in the vicinities of the door openings are the areas A2L, A2R on the lateral sides of the vehicle body of the vehicle 100, for example. Here, the reflector 3 has a planar shape. As shown in FIG. 3, the reflector 3 is arranged on one surface of a holder 4 having a triangular prism-shape. The holder 4 is supported by the driver 6 to be described below. Note that the holder 4 can have any shape as long as the reflector 3 can be arranged thereon. As shown in FIG. 2, another surface 4A of the holder 4 may form a part of the light path 2 when the vehicle is traveling.

In a situation where the vehicle body side structure 10 is used as a welcome lamp, as shown in FIG. 3, the reflector 3 faces the cornering light 1. For example, the reflector 3 reflects the light from the cornering light 1 rearward of the vehicle 100 as light L1, to illuminate the area A2L shown in FIG. 1, for example.

<User Sensor>

The user sensor 20 is a device to detect approach of a user toward the vehicle 100. For example, the user sensor 20 receives signals from a smart key carried by the user and measures a distance from the vehicle 100 to the user, to detect the approach of a user based on changes in distance. Further, for example, the user sensor 20 receives the signals from the smart key or positioning signals such as from a GPS (global positioning system) provided in a smartphone carried by the user, to measure a distance and a direction of the user with respect to the vehicle 100.

<Light Controller>

The light controller 8 controls putting on and off the cornering light 1.

In a situation where the vehicle 100 is traveling, during which the vehicle body side structure 10 is not used as a welcome lamp, the light controller 8 puts on and off the cornering light 1 in conjunction with operation of a blinker or a steering wheel of the vehicle 100. In a situation where the vehicle body side structure 10 is used as a welcome lamp, the light controller 8 controls to put on the cornering light 1, when the user sensor 20 has detected the approach of a user.

The light controller 8 may control brightness, emission colors, light distributions, and the like of the cornering light 1. The brightness may be controlled by supplied power. The emission colors may be controlled, for example, by selecting and putting on a plurality of light-emitting members having different emission colors. The light distributions may be controlled by moving a position and orientation of the cornering light 1, or by arranging a plurality of light-emitting members in different orientations and selecting the light-emitting members to be put on.

Further, the light-emitting members may be put on in conjunction with light other than the cornering light.

<Driver>

The driver 6 is a device which drives the reflector 3 to move into and out of the light path 2 via the holder 4. The driver 6 is controlled by the reflection controller 7.

<Reflection Controller>

The reflection controller 7 controls the reflector 3 to change a range of area illuminated by the cornering light 1. The reflector 3 is controlled by controlling the driver 6 to drive the holder 4.

When the user sensor 20 has detected the approach of a user, the reflection controller 7 controls the reflector 3 such that the area in the vicinity of the door openings is illuminated. For example, as shown in FIG. 3, the reflection controller 7 may control the driver 6 to move the reflector 3 into the light path 2. The reflection controller 7 controls a position and orientation of the reflector 3, to adjust an illuminated area. The reflection controller 7 makes the reflector 3 face the cornering light 1, to reflect the light from the cornering light 1 rearward of the vehicle 100. Further, the reflector 3 may be positioned at the same height as the cornering light 1 and a line normal to the reflector 3 may be directed diagonally downward to brightly illuminate the ground.

After the user has got in the vehicle 100, the reflection controller 7 controls the reflector 3 to illuminate an area in a turning direction. For example, as shown in FIG. 2, the reflection controller 7 controls the driver 6 to move the reflector 3 out of the light path 2.

<Modification>

When the user sensor 20 has detected the approach of a user, the reflection controller 7 may control both the cornering light 1 and the reflector 3. In the example shown in FIG. 4, the reflection controller 7 moves the cornering light 1. In the example, the support 5, having a power device such as an actuator, movably supports the cornering light 1. The reflection controller 7 controls the actuator or the like, to control a position and orientation of the cornering light 1. The reflection controller 7 controls both the cornering light 1 and the reflector 3, so that a variable range of an illuminated area is expanded.

Figure 5:
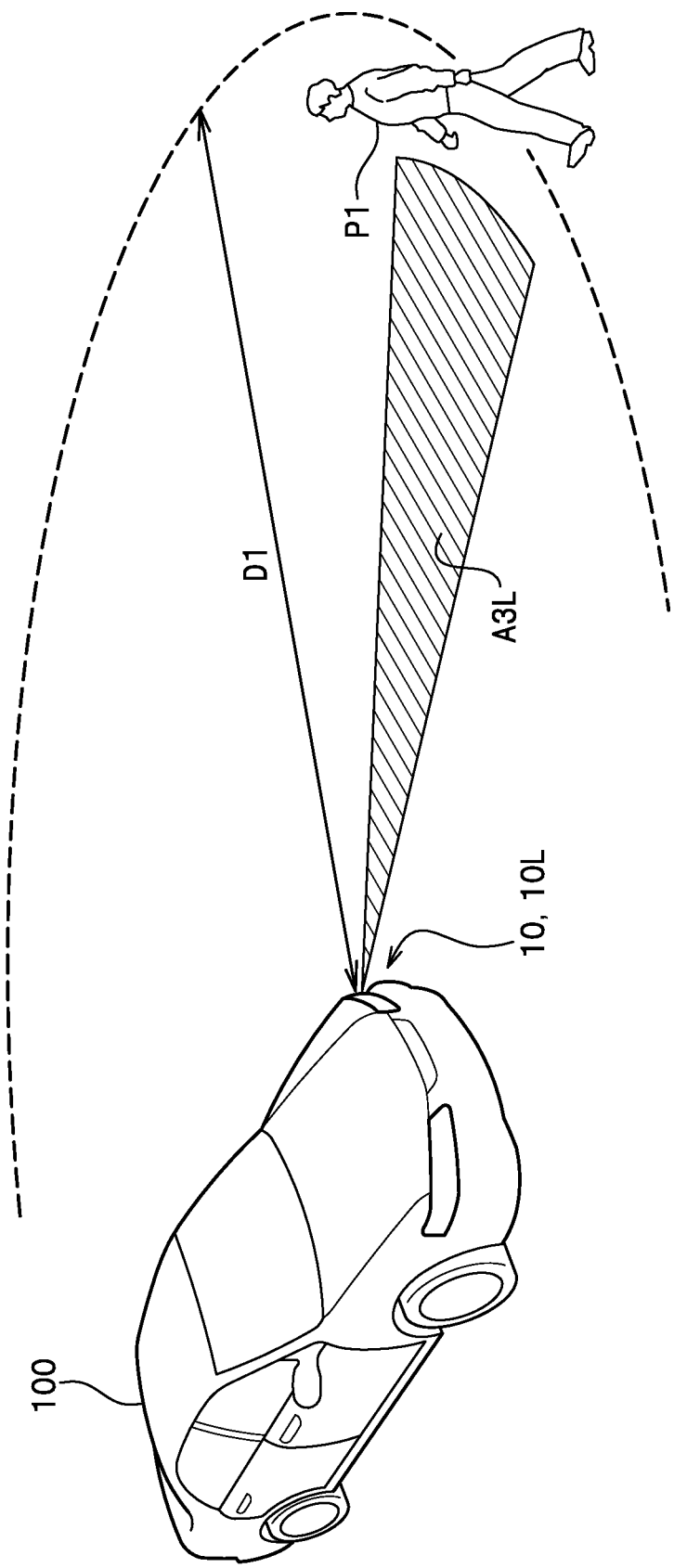
FIG. 5 is a perspective view of an example showing a positional relationship between a welcome lamp by the vehicle body side structure according to the embodiment and a user.

Further, for example, as shown in FIG. 5, when a user has approached the vehicle 100, positions and orientations of the cornering light 1 and the reflector 3 may be changed to follow movement of a user P1 so as to illuminate an area in a stepping direction of the user P1. In addition, based on a distance D1 from the vehicle 100 or the vehicle body side structure 10 (10L) to the user, brightness of the cornering light 1 may be changed. For example, the darkness may be increased with the increasing distance D1.

Figure 6:
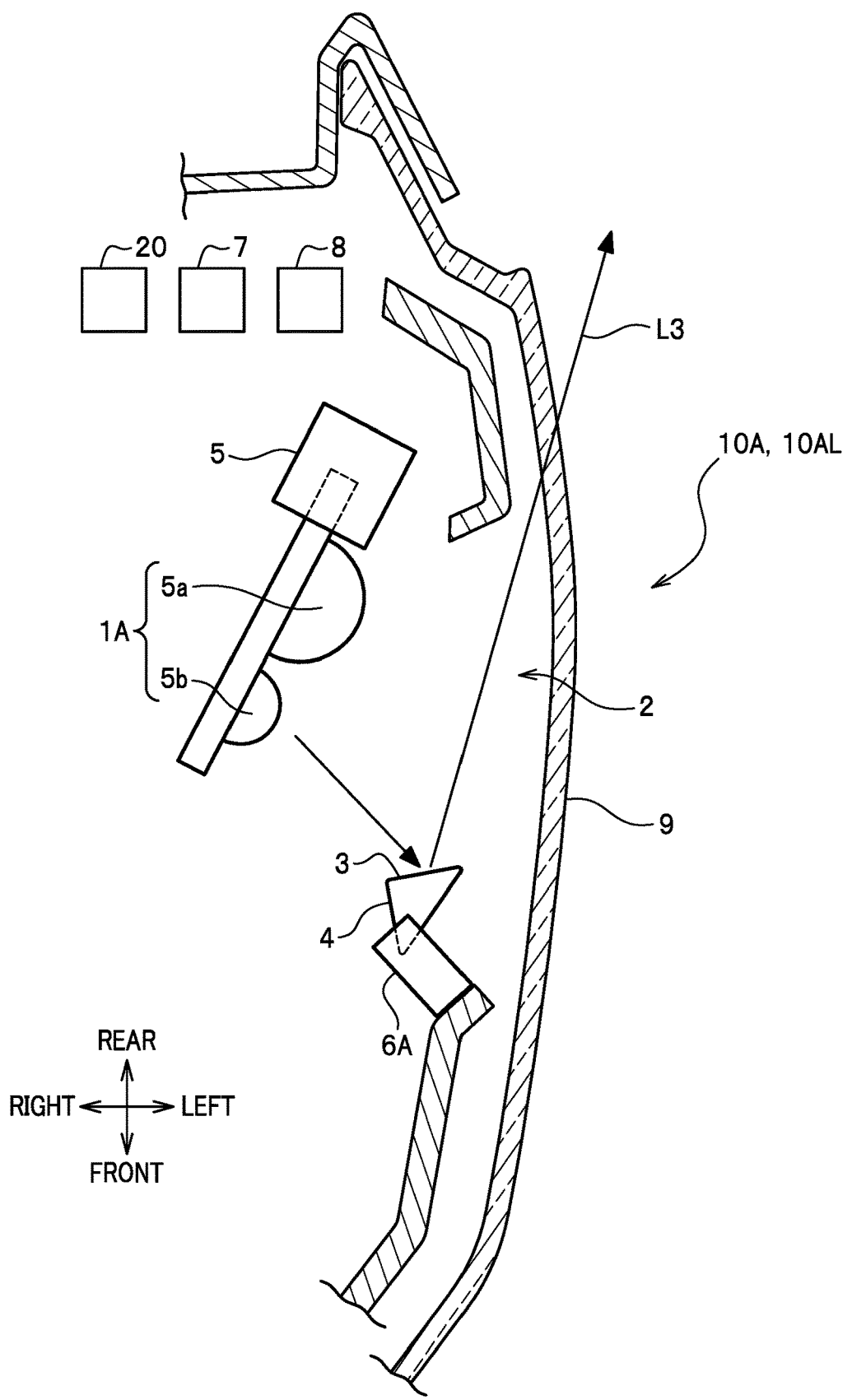
FIG. 6 is a schematic cross-sectional view of a vehicle body side structure according to another embodiment.

Another embodiment of the present disclosure is described with reference to FIG. 6. The same components as in the above embodiment are denoted by the same reference signs, and duplicate descriptions are omitted.

A vehicle body side structure 10A according to another embodiment includes vehicle body side structures 10AL, 10AR, which are symmetrically provided, on both sides at a front of the vehicle 100. FIG. 6 shows the vehicle body side structure 10AL on the left side.

A cornering light 1A of the vehicle body side structure 10A includes a first light emitter 5A and a second light emitter 5B, which can be controlled separately from each other. Further, the vehicle body side structure 10A includes a fixing part 6A instead of the driver 6. The holder 4 having the reflector 3 thereon is fixed to the fixing part 6A. The reflector 3 is fixed in the light path 2 and reflects at least a part of the light to illuminate the area in the vicinity of the door opening on the lateral side of the vehicle body.

The light controller 8 controls putting on and off the first light emitter 5a and second light emitter 5b of the cornering light 1A. In a situation where the vehicle 100 is traveling, during which the vehicle body side structure 10A is not used as a welcome lamp, the light controller 8 puts on and off the cornering light 1A in conjunction with operation of a blinker or a steering wheel of the vehicle 100. At this time, the second light emitter 5B has been put off. In a case where the vehicle body side structure 10A is used as a welcome lamp, the light controller 8 controls to put on the first light emitter 5a when the user sensor 20 has detected the approach of a user in front of the vehicle, and controls to put on the second light emitter 5b when the user sensor 20 has detected the approach of a user in the area in the vicinities of the door openings. At this time, control may also be made to put on both the first light emitter 5a and second light emitter 5b when the approach of a user has been detected.

The vehicle body side structure 10 of the present disclosure, with a cornering light configured to illuminate an area in a turning direction when the vehicle turns, includes: the cornering light 1 as a light source; the light path 2 forming a path, through which light from the cornering light 1 passes toward the area in the turning direction; and the reflector 3 provided in the light path 2 and reflecting at least a part of the light to illuminate an area in the vicinity of the door openings on the lateral side of the vehicle body.

According to the configuration, the vehicle body side structure 10 includes the reflector 3 in the light path 2 through which light from the cornering light 1 as a light source passes toward the area A1*l* or A1R in the turning direction of the vehicle 10. The reflector 3 reflects at least a part of the light to illuminate the area in the vicinity of the door openings on the lateral side of the vehicle body. The vehicle body side structure 10 uses the cornering light 11 of the vehicle 100 to form a welcome lamp with a simple configuration, which illuminates an area in the vicinity of the door openings on the lateral side of the vehicle body.

The vehicle body side structure 10 preferably includes the light controller 8 to control putting on and off the cornering light 1 and the user sensor 20 to detect that a user has approached the vehicle 100, so that the light controller 8 puts on the cornering light 1 when the user sensor 20 has detected the approach of a user.

According to the configuration, the user sensor 20 detects that a user has approached the vehicle 100, and the light controller 8 puts on the cornering light 1, so that the vehicle body side structure 10 provides a welcome lamp. Further, even when it is dark around the vehicle 100, a user can easily recognize a location of the vehicle 100. In addition, a user can easily find obstacles on the ground and can easily operate a door handle of the vehicle 100, to provide safety and convenience to the user. Still further, control may be made to put on the cornering light 1 in response to a user operating remotely to open the door.

The vehicle body side structure 10 preferably includes the reflection controller 7 to change a range of area illuminated by the cornering light 1, so that the reflection controller 7 controls the reflector 3 to illuminate an area in the vicinity of the door opening when the user sensor 20 has detected the approach of a user, and controls the reflector 3 to illuminate an area in a turning direction after the user has got in the vehicle 100.

According to the configuration, the user sensor 20 detects the approach of a user, and the vehicle body side structure 10 provides a welcome lamp in response to the approach of a user. Further, after the user has got in the vehicle, an area in a turning direction of the vehicle 100 is illuminated for safe traveling.

The vehicle body side structure 10 preferably includes the driver 6 to drive the reflector 3 to move into and out of the light path 2, so that the reflection controller 7 controls the driver 6 to move the reflector 3 into the light path 2 when the user sensor 20 has detected the approach of a user, and controls the driver 6 to move the reflector 3 out of the light path 2 after the user has got in the vehicle 100.

According to the configuration, in the vehicle body side structure 10, when the user sensor 20 has detected the approach of a user, the reflection controller 7 controls the driver 6 to move the reflector 3 into the light path 2 so that the reflector 3 is placed in the light path 2. Further, after the user has got in the vehicle 100, the reflector 3 is moved out of the light path 2, to be accommodated without being used.

Note that some functions of the light controller 8, the reflection controller 7, and the user sensor 20 may be provided as functions of a computer of the vehicle.

Further, the reflector 3 may have a concave or convex surface. With the concave surface, an illuminated area is made narrower.

What is claimed is:

1. A vehicle body side structure, with a cornering light configured to illuminate an area in a turning direction when a vehicle turns, comprising:
   the cornering light as a light source;
   a light path forming a path, through which light from the cornering light passes toward the area in the turning direction; and
   a reflector provided in the light path and rearwardly reflecting at least a part of the light to illuminate an area in a vicinity of a door opening on a lateral side of a vehicle body.

2. The vehicle body side structure as claimed in claim 1 comprising:
   a light controller configured to control putting on and off the cornering light; and
   a user sensor configured to detect approach of a user toward the vehicle,
   wherein the light controller puts on the cornering light when the user sensor has detected approach of the user.

3. The vehicle body side structure as claimed in claim 2 comprising a reflection controller configured to change a range of area illuminated by the cornering light,
   wherein the reflection controller controls the reflector to illuminate the area in the vicinity of the door opening when the user sensor has detected the approach of the user, and controls the reflector to illuminate the area in the turning direction after the user has got in the vehicle.

4. The vehicle body side structure as claimed in claim 3, comprising a driver configured to drive the reflector to move into and out of the light path,
   wherein the reflection controller controls the driver to move the reflector into the light path when the user sensor has detected the approach of the user, and controls the driver to move the reflector out of the light path after the user has got in the vehicle.

* * * * *